(12) United States Patent
Muramatsu (10) Patent No.: US 9,403,683 B2
(45) Date of Patent: *Aug. 2, 2016

(54) CARBON NANOTUBE AND PRODUCTION METHOD THEREFOR

(75) Inventor: Kazuo Muramatsu, Kobe (JP)

(73) Assignee: INCUBATION ALLIANCE, INC., Kobe-shi (JP)

( * ) Notice: Subject to any disclaimer, the term of this patent is extended or adjusted under 35 U.S.C. 154(b) by 466 days.

This patent is subject to a terminal disclaimer.

(21) Appl. No.: 13/882,834

(22) PCT Filed: Nov. 21, 2011

(86) PCT No.: PCT/JP2011/076796
§ 371 (c)(1),
(2), (4) Date: May 1, 2013

(87) PCT Pub. No.: WO2012/070527
PCT Pub. Date: May 31, 2012

(65) Prior Publication Data
US 2013/0224483 A1      Aug. 29, 2013

(30) Foreign Application Priority Data

Nov. 25, 2010   (JP) .................................. 2010-262310

(51) Int. Cl.
*C01B 31/02* (2006.01)
*B82Y 40/00* (2011.01)
(Continued)

(52) U.S. Cl.
CPC ............. *C01B 31/0226* (2013.01); *B01J 23/75* (2013.01); *B01J 35/002* (2013.01); *B82Y 30/00* (2013.01);
(Continued)

(58) Field of Classification Search
CPC .... C01B 31/0226; B82Y 30/00; B82Y 40/00; B01J 23/75; B01J 35/002; C01P 2004/04; C01P 2004/64
See application file for complete search history.

(56) References Cited

U.S. PATENT DOCUMENTS

2012/0077020 A1   3/2012   Muramatsu et al.

FOREIGN PATENT DOCUMENTS

| CN | 102448880 A | 5/2012 |
|----|---|---|
| EP | 2 436 648 | 4/2012 |

(Continued)

OTHER PUBLICATIONS

Zhang, M. et al.; "Ribbon-like nanostructures transformed from carbon nanotubes at high temperature and pressure;" NanoStructured Materials; Oct. 1, 1998; vol. 10; No. 7; pp. 1145-1152.*

(Continued)

*Primary Examiner* — Richard M Rump
(74) *Attorney, Agent, or Firm* — Kratz, Quintos & Hanson, LLP (57) ABSTRACT

The present invention provides CNT, in particular CNT having inherent properties thereof, which has a thin wall and does not form a bundle, and an efficient production method of the CNT. The method is for producing CNT, the whole length or a part thereof is compressed to form a band, said method comprises preparing a powdery and/or particulate material of an organic compound pre-baked to an extent of containing remaining hydrogen and allowed to carry a catalyst, which may be a transition metal, other metal or other element, thereon; charging the powdery and/or particulate material of the organic compound in a closed vessel made of a heat resistant material; and subjecting the powdery and/or particulate material of the organic compound together with the vessel to hot isostatic pressing treatment using a compressed gas atmosphere, wherein a maximum ultimate temperature at the hot isostatic pressing treatment is 750 to 1200° C.

9 Claims, 6 Drawing Sheets

(51) Int. Cl.
*B01J 23/75* (2006.01)
*B01J 35/00* (2006.01)
*B82Y 30/00* (2011.01)

(52) U.S. Cl.
CPC ............. *B82Y 40/00* (2013.01); *C01P 2004/04* (2013.01); *C01P 2004/64* (2013.01); *Y10T 428/2918* (2015.01)

(56) References Cited

FOREIGN PATENT DOCUMENTS

| | | | |
|---|---|---|---|
| JP | 2-51412 A | 2/1990 | |
| JP | 2526408 B2 | 8/1996 | |
| JP | 2541434 B2 | 10/1996 | |
| JP | 2009-184851 A1 | 8/2009 | |
| JP | 2009-196840 A1 | 9/2009 | |
| WO | 2010/014107 A1 | 2/2010 | |
| WO | 2010/092996 A1 | 8/2010 | |
| WO | 2010137592 | 12/2010 | |

OTHER PUBLICATIONS

Korean Office Action dated May 28, 2014 in the corresponding Korean patent application No. 9-5-2014-036791018.

International Preliminary Report on Patentability dated Jun. 12, 2013, in counterpart International Application No. PCT/JP2011/076796.

Korean Office Action dated Jul. 28, 2015 for corresponding Korean divisional patent application.

Tongxiang Cui et al., Synthesis and Enhanced Field-Emission of Thin-Walled, Open-Ended, and Well-Aligned N-Doped Carbon Nanotubes, Nanoscale Res. Lett., vol. 5, pp. 941-948. Cited for the first time in Korean Office Action dated Jul. 28, 2015.

Japanese Office Action dated Aug. 11, 2015 for corresponding Japanese patent application.

Marcelo Motta et al., High performance Fibres from "Dog Bone" Carbon Nanotubes, Advanced Materials, 2007, 19, p. 3731-3726. Cited for the first time in Japanese Office Action dated Aug. 11, 2015.

Taiwanese Office Action issued Apr. 11, 2014 in counterpart application.

Chinese Office Action dated Jun. 5, 2014, in the corresponding Chinese patent application No. 201180054216.0, with partial English translation.

Corrias, M. et al.; "High purity multiwalled carbon nanotubes under high pressure and high temperature;" Carbon; Jan. 1, 2003; vol. 41; No. 12; pp. 2361-2367.

Supplementary European Search Report issued for European Patent Application No. 11842923.2 dated Mar. 27, 2014.

S. Iijima; "Helical microtubules of graphitic carbon;" Nature; vol. 354; Nov. 7, 1991; pp. 56-58 (3 Sheets)/p. 3 of specification.

M. Inagaki; Carbon; No. 139; 1989; pp. 207-213 (7 Sheets)/p. 3 of specification.

K. Muramatsu, et al.; "Development of Densified Amorphous Carbon and Its Application;" R & D Kobe Steel Engineering Reports; vol. 39; No. 4; Oct. 1989; pp. 35-38 and end sheet (5 Sheets)/Cited in International Search Report.

International Search Report for International Application No. PCT/JP2011/076796 dated Mar. 13, 2012.

* cited by examiner

Enlargement of 1-6

CARBON NANOTUBE AND PRODUCTION METHOD THEREFOR

TECHNICAL FIELD

The present invention relates to a production method of a carbon nanotube and a novel form of a carbon nanotube.

BACKGROUND ART

A carbon nanotube (CNT) is a very minute substance having an outer diameter of the order of nanometer and comprising cylindrical shape carbon hexagonal plane having a thickness of several atomic layers, which was found in 1991 (Non-patent Document 1). A carbon nanotube composed of a single layer graphene sheet is called a mono-layer CNT or SWCNT (Single-walled Carbon Nanotube) having an outer diameter of about 0.5 nm to about 10 nm, and a carbon nanotube composed of multi-layer graphene sheets is called a multi-layer CNT or MWCNT (Multi-walled Carbon Nanotube) having an outer diameter of about 10 nm to about 100 nm. Currently most of commercially available carbon nanotubes are multi-layer CNT, which are a mixture with carbon fibers and graphite fibers that do not form a tube.

A graphene layer consisting CNT can hold either of electron or hole as a carrier, and therefore, it can form any of intercalation compounds of electron-accepting acceptor type and electron-donating donor type. These intercalation compounds have been researched and developed so far in a graphite having many laminated graphene layers and are known as graphite intercalation compounds (Non-patent Document 2).

Production methods of a carbon nanotube are described in, for example, Patent Document 1 and Patent Document 2 and explained systematically as follows.
1) Arc discharging method
High voltage is applied between carbon electrodes in vacuo or under reduced pressure to cause arc discharging and deposit carbon vaporized at locally super high temperature (4050° C.) on the negative electrode.
2) Laser vaporization method
Laser is emitted to a mixture of carbon and a catalyst in vacuo or under reduced pressure to vaporize carbon at a locally super high temperature (4050° C.), and grow the vaporized carbon into CNT on the catalyst.
3) Chemical vapor deposition method (CVD method)
CNT is deposited on a catalyst by passing a carbon-containing gas (hydrocarbon) and a metal catalyst through a reaction tube heated to 1000-2000° C.
4) Other methods such as SiC surface decomposition method and polymer blend spinning method

PRIOR ART DOCUMENTS

Patent Documents

Patent Document 1: JP 2526408 B
Patent Document 2: JP 2541434 B

Non-Patent Documents

Non-patent Document 1: Nature, 354: pp. 56-58, 1991
Non-patent Document 2: Michio Inagaki, Carbon 1989 (No. 139) 207-213

SUMMARY OF THE INVENTION

Problem to be Solved by the Invention

Since CNT has low productivity and is expensive as described above, the establishment of its efficient production method is required. In traditional arc discharge methods and laser vaporization methods, super high temperature up to a sublimation point (4050° C.) at which carbon is vaporized is necessary and an extremely large energy is required. For this purpose, large-sized equipment is required. In addition, in an arc discharge method and a laser vaporization method, CNT, fullerene, carbon nanohorn and graphene and the like which are generated unintentionally are screened, and therefore, although SWCNT is relatively easily generated, yield and productivity are still very low, i.e., production efficiency of only several grams per day.

In a CVD method for CNT for enhancing productivity, a substrate for carrying a catalyst is necessary and a generation reaction occurs on a two-dimensional substrate plane. Therefore, in order to enhance productivity, a large area is required, and a generation rate is only 0.2 to 0.3 g/hr·cm$^2$ and productivity is still low. A fluid bed method as a method for reacting CNT on a three-dimensional space has been developed by National Institute of Advanced Industrial Science and Technology and Nikkiso Co., Ltd. However, hydrocarbon gas (liquid) as a starting material and a catalyst come into contact with each other fluidly and nonuniformly, and therefore, carbide can be obtained but a probability of generation of SWCNT and MWCNT is low and especially yield of SWCNT is low.

Currently, productivity of a multilayer CNT is 1 kg to 10 kg/day and a price thereof is 30,000 to 100,000 yen/kg, productivity of a single layer CNT is 10 to 100 g/day and a price thereof is 300,000 to 1,000,000 yen/kg. Thus, prices are very high and a mass production method has not been established. Such being the case, there is a problem that irrespective of excellent characteristics, application development thereof has not proceeded.

CNT exercises its inherent properties (extremely high carrier mobility, i.e. high electric conductivity and thermal conductivity) in thinner thickness, while developing its property of graphite strongly as the number of graphene layers consisting the wall increases and the diameter thereof increases. Traditionally, the diameter of CNT has to be decreased to produce a thin CNT and as a result, a Van der Waals force on the surface of CNT becomes large and CNT begin to form a bundle with each other. The CNT forming a bundle develops, depending on the degree of formation thereof, the graphite property more strongly than the inherent property of the CNT. Therefore, when the CNT is used, the bundle needs to be raveled out, but this procedure is complicated and deemed a problem. In addition, in CNT with a small diameter, the possibility of injuring health due to dust exposure has been concerned.

Means to Solve the Problem

As a result of intensive study in order to solve the above problem, the inventors found out an effective production method of a CNT and a novel form of a CNT obtained therefrom and completed the present invention. This novel CNT is "a carbon nanotube which is compressed to form a band in its whole length or a part thereof (hereinafter, also referred to as "a band shape carbon nanotube" or "a band shape CNT")" and is a new formation.

That is, the present invention is:
[1] a production method of a carbon nanotube which is compressed to form a band in its whole length or a part thereof, comprising
preparing a powdery and/or particulate material of an organic compound pre-baked to an extent of containing remaining hydrogen and allowed to carry a catalyst, which may be a transition metal, other metal or other element, thereon, charging the powdery and/or particulate material of the organic compound in a closed vessel made of a heat resistant material, and subjecting the powdery and/or particulate material of the organic compound together with the vessel to hot isostatic pressing treatment using a compressed gas atmosphere, wherein a maximum ultimate temperature at the hot isostatic pressing treatment is 750 to 1200° C.,

[2] the production method of the above [1], wherein the width of the band shape part of the carbon nanotube is 15 nm to 300 nm and the thickness thereof is 1 nm to 20 nm,

[3] the production method of any of the above [1] or [2], wherein the catalyst is one or two or more selected from the group consisting of (1) a transition metal selected from tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, manganese, americium, promethium, uranium, copper, samarium, gold, actinium, neodymium, berkelium, silver, praseodymium, lanthanum, californium, europium, ytterbium, cerium, plutonium, neptunium, (2) other metals selected from beryllium, germanium, calcium, strontium, barium, radium, aluminum, magnesium, zinc, lead, cadmium, thallium, bismuth, tin, lithium, indium, sodium, potassium, rubidium, gallium and cesium, (3) other elements selected from antimony, polonium, silicon and tellurium, (4) sulfide, boride, oxide, chloride, hydroxide, nitride and organometallic compound of any one of the above (1) to (3), and (5) a mixture of any of the above (1) to (3) and (4) and sulfur and/or sulfide (including an organosulfur compound) and a mixture of any of the above (1) to (3) and (4) and boron and/or boride (including an organoboron compound),

[4] the production method of any of the above [1] to [3], wherein the powdery and/or particulate material carrying catalysts adsorbs a transition metal through a process of contacting the powdery and/or particulate material of the organic compound before or after pre-baked with an ion or complex of the transition metal in a solution-state,

[5] the production method of the above [4], wherein a solvent in the solution-state is selected from water, an alcohol or a mixture of water and alcohol, and the ion or complex of the transition metal in the solution-state is obtained by dissolving an acetate, nitrate, sulfate, chloride, alkoxide, organic metal compound of the transition metal or a transition metal acetylacetonate in the solvent,

[6] the production method of any of the above [1] to [5], wherein the organic compound is one or two or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea formaldehyde resin, melamine resin, benzoguanamine resin, epoxy resin, diallyl phthalate resin, unsaturated polyester resin, a bisphenol A type epoxy resin, Novolac type epoxy resin, polyfunctional epoxy rein, alicyclic epoxy resin, alkyd resin, urethane resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene, anthracene, petroleum pitch, coal pitch, petroleum coke, coal coke, carbon black, activated carbon, waste plastic, waste wood, waste plant and garbage,

[7] the production method of any of the above [1] to [6], wherein the powdery and/or particulate material of the organic compound which is pre-baked to an extent of containing remaining hydrogen is one or two or more powdery and/or particulate materials selected from the group consisting of petroleum coke, coal coke and carbon black having hydrogen corresponding to the remaining hydrogen beforehand,

[8] the production method of any of the above [1] to [7], wherein the closed vessel made of a heat resistant material is a screw-capped graphite crucible,

[9] a carbon nanotube in which the whole length or a part thereof is compressed to form a band, and

[10] the carbon nanotube of the above [9], wherein the width of the band shape part of the carbon nanotube is 15 nm to 300 nm and the thickness thereof is 1 nm to 20 nm.

Effects of the Invention

According to the present invention, CNT can be produced by a CVD reaction using a general large size HIP equipment and a vessel made of a heat resistant material such as graphite as a reaction vessel, and therefore, productivity is enhanced significantly and materials of low price can be provided. Specifically it becomes possible to charge a starting material of 10 ton/batch in large-scaled HIP equipment being currently available on the market, and production of 5 ton/batch per day at yield of 50% can be obtained.

In addition, it is possible to allow an organic compound to carry a catalyst for generating CNT directly thereon or to carry a nano size catalyst ionized in a solution thereon, and therefore, CNT having a controlled diameter (representing "outer diameter" of the tube and hereinafter, also referred to as merely "diameter") can be produced with high selectivity.

According to the above method of the present invention, a band shape CNT in which CNT having a relatively thin wall for its relatively large diameter is pressed in its whole length or a part thereof can be obtained. The band shape CNT has a characteristic of hardly forming a bundle with each other.

Since the band shape CNT does not form a bundle, a high-level operation (such as ultrasonic wave treatment) which is usually required for raveling the bundle out is not necessarily required and thus the band shape CNT can be easily returned to the original CNT (having a relatively thin wall for its relatively large diameter).

The thus obtained CNT has, due to its thin wall, a characteristic of providing performance similar to SWCNT. On the other hand, the CNT has, due to its large diameter, a characteristic of being easily-handled in terms of traditionally concerned injuries to health due to dust exposure.

EMBODIMENT FOR CARRYING OUT THE INVENTION

According to the present invention, CNT can be produced selectively by using, as a starting material, the organic compound which is a solid organic material having high carbon density and causing CVD reaction highly efficiently without sublimation of carbon in a three-dimensional area on the catalyst, functioning as a reaction starting point, carried on the organic compound. A CNT, in particular a band shape CNT, can be generated selectively by regulating factors such as kind of the organic compound as a starting material, a temperature for pre-baking the organic compound, an amount of remaining hydrogen contained in the pre-baked organic compound, kind, amount and size of a catalyst to be carried on the organic compound, a maximum ultimate temperature, a maximum ultimate pressure, a heating and pressing speed and a heating and pressing pattern at the HIP treatment and a material of a graphite vessel and a sealing method thereof.

For example, a powdery and/or particulate material of an organic compound is carbonized under proper pre-baking conditions to prepare a pre-baked starting material in a state of hydrogen remaining therein and then the pre-baked powdery and/or particulate material of the organic compound is allowed to carry a catalyst thereon or a powdery and/or particulate material of the organic compound previously allowed to carry a catalyst thereon is pre-baked to prepare the pre-baked starting material carrying the catalyst. Then, the pre-baked powdery and/or particulate material of the organic compound is charged in a closed vessel made of a heat-resistant material and used as a reaction vessel, and is subjected to heating and pressing treatment with hot isostatic pressing equipment (HIP) by using a compressed gas atmosphere such as argon.

Additionally, according to the present invention, the production of CNT can be carried out by previously allowing a carrier composed of metal oxide (for example, zeolite, alumina, magnesia) to carry the catalysts and then mixing the carrier and the pre-baked starting material to prepare the pre-baked starting material carrying the catalysts, followed by the same treatment as in the above.

In particular, in the present invention, a band shape CNT can be efficiently produced by regulating a maximum ultimate temperature in the HIP treatment in a certain range.

In the present invention, the width of the band shape part of the carbon nanotube is in the range of about 15 nm to about 300 nm, preferably about 25 nm to about 200 nm and more preferably about 25 nm to about 150 nm. The thickness of the wall constituting the band shape CNT (wall thickness) is in the range of about 1 to about 20 nm, preferably about 2 nm to about 15 nm and more preferably about 2 nm to about 10 nm.

The mechanism of forming such band shape CNT is considered as follows, but the present invention does not intend to be limited thereto. According to the present invention, as described above, though CNT having a relatively thin wall for its relatively large diameter can be obtained, the CNT is considered to be easily pressed in the air pressure after hot isostatic pressing treatment. That is, in the case where CNT is formed by hot isostatic pressing treatment, isotropic high pressure is applied with a pressure medium such as argon and nitrogen. For example, under argon gas of 50 PMa, since high density argon exists on both of the outer surface of CNT and the inner surface of CNT with a high density and isotropic pressure is equally applied on all surfaces, the CNT can grow with keeping a circular or elliptical cross-section and can maintain the shape even if the thickness of the wall of the CNT is thin. Moreover, high density argon shields Van der Waals force on the outer surface of CNT (outermost graphene surface) and prevents the CNT from forming a bundle with adjacent CNT. Therefore, a mass composed of independent CNT which do not form a bundle is formed. However, after hot isostatic pressing treatment, when the pressure is gradually decreased to the air pressure, the density of argon in the inside space of CNT is also decreased and inner surfaces of CNT come close to or contact to each other by Van der Waals force on the graphene surface and then led to a compressed shape to form a band shape CNT of the present invention.

In the thus obtained band shape CNT, since the inner sides of the wall come to close or contact to each other, Van der Waals force outside the wall is wholly decreased and argon gas used as a pressure medium is adsorbed and remains physically on the outer surface of CNT. Therefore, it is considered that the CNT exhibits a characteristic of hardly forming a bundle with each other.

In addition, by drying and heat-treating a band shape CNT at the temperature of not less than 100° C. to remove adsorption gas and subsequently dispersing the band shape CNT into an organic solvent, the band shape CNT can be easily returned to the original CNT (CNT having a relatively thin wall for its relatively large diameter). Examples of the CNT are, for example, the one having an outer diameter of about 9.55 nm to about 191 nm, preferably about 15.9 nm to about 127 nm and more preferably about 15.9 nm to about 95.5 nm, and a thickness of the wall of about 1 nm to about 20 nm, preferably about 2 nm to about 15 nm and more preferably about 2 nm to about 10 nm, and the one having the outer diameter as shown above and ratio of the thickness of the wall with respect to the outer diameter being less than 15%, preferably less than 13% and more preferably less than 10%.

The organic compound to be used in the present invention is a solid organic material having a relatively high density. Heating of such an organic compound promotes increase in a molecular weight and makes oxygen, nitrogen and hydrogen atoms in the organic compound structure instable and to be released, and thereby, carbonization proceeds. In the present invention, the (pre-baked) organic compound of which carbonization is stopped in a state of carbon, hydrogen and oxygen remaining in the organic compound is used as a pre-baked starting material.

Examples of an organic compound of the present invention are natural organic polymers such as starch, cellulose, protein, collagen, alginic acid, dammar, kovar, rosin, gutta-percha and natural rubber; semisynthetic polymers such as cellulose resin, cellulose acetate, cellulose nitrate, cellulose acetate butyrate, casein plastic and soybean protein plastic; and synthetic polymers such as thermosetting reins such as phenol resin, urea formaldehyde resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin and urethane resin, thermoplastic resins such as vinyl chloride resin, polyethylene, polypropylene and polystyrene, synthetic rubbers such as polyisoprene and butadiene, synthetic fibers such as nylon, vinylon, acrylic fiber and rayon, and other materials such as polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene and anthracene.

It is a matter of course that petroleum pitch, coal pitch, petroleum coke, coal coke, carbon black and active carbon which are generated when fossil fuels such as petroleum and coal, for example, being refined can be used as a starting material. In addition, toward the establishment of resources-recycling society, introduction of carbonization system has been advanced from the viewpoint of effective utilization of carbon in wastes, and waste plastics which are mixtures of the above-mentioned various resins, waste wood, waste plant and food wastes such as garbage can also be used as a starting material.

Among these, thermosetting resins such as phenol resin are preferred from the viewpoint of a large amount of remaining carbon after heat treatment, waste plastics and waste carbides are preferred from the viewpoint of production cost and from environmental point of view by an effect of reducing $CO_2$, and carbon black is preferred from the viewpoint of production of carbon materials of fine size.

The organic compound to be used in the present invention is preferably a powdery and/or particulate material. In the powdery and/or particulate material of the present invention, a size and shape of the component units thereof are not limited, and the powdery and/or particulate material incorporates a powder comprising relatively fine component units or particles comprising relatively coarse component units of aggregate. The shape of these component units includes various ones such as particle, small piece, long fiber and short fiber.

The organic compounds to be used in the present invention can include those which contain beforehand hydrogen corresponding to the remaining hydrogen in an amount being proper for the use in the present invention even without pre-baking. When the powdery and/or particulate material of the organic compound contains beforehand a proper amount of hydrogen, pre-baking is not required, and the powdery and/or particulate material of the organic compound can be used as it is as "the powdery and/or particulate material of the organic compound pre-baked to an extent of containing remaining hydrogen" in the present invention. Namely, in the present invention, "the powdery and/or particulate material of the organic compound pre-baked to an extent of containing remaining hydrogen" includes one not subjected to pre-baking and reserving a proper amount of hydrogen which should be reserved in a powdery and/or particulate material of the organic compound after pre-baking. Examples of such a powdery and/or particulate material of the organic compound are petroleum coke, coal coke, carbon black and the like.

In the present invention, the organic compounds can be used alone or can be used in a mixture of two or more thereof.

The catalyst to be used in the present invention is one of factors for controlling, amount, shape, size (diameter, number of laminated graphene layers, length and the like) and the like of CNT to be generated. Examples of usable catalysts are (1) transition metals selected from tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, manganese, americium, promethium, uranium, copper, samarium, gold, actinium, neodymium, berkelium, silver, praseodymium, lanthanum, californium, europium, ytterbium, cerium, plutonium, neptunium and the like, (2) other metals selected from beryllium, germanium, calcium, strontium, barium, radium, aluminum, magnesium, zinc, lead, cadmium, thallium, bismuth, tin, lithium, indium, sodium, potassium, rubidium, gallium, cesium and the like, (3) other elements selected from antimony, polonium, silicon, tellurium and the like, (4) sulfide, boride, oxide, chloride, hydroxide, nitride and organometallic compound of any one of the (1) to (3), (5) a mixture of any of the (1) to (3) and (4) above and sulfur and/or sulfide (including an organosulfur compound) and a mixture of any of the (1) to (3) and (4) above and boron and/or boride (including an organoboron compound). Among these, preferred are (1) transition metals selected from tungsten, tantalum, molybdenum, niobium, iridium, vanadium, chromium, zirconium, titanium, iron, cobalt, nickel, manganese, copper, samarium, neodymium, silver, praseodymium, lanthanum and the like, (2) other metals selected from calcium, strontium, barium, aluminum, magnesium, zinc, lead, cadmium, bismuth, tin, lithium, indium, sodium, potassium, rubidium, gallium, cesium and the like, (3) other elements such as silicon, (4) oxide, chloride, hydroxide, nitride and organometallic compound of any one of the (1) to (3), (4) a mixture of any of the (1) to (3) and (4) above and sulfur and/or sulfide (including an organosulfur compound) and a mixture of any of the (1) to (3) and (4) above and boron and/or boride (including an organoboron compound). These catalysts can be used alone or can be used in a mixture of two or more thereof.

In the present invention, an extremely small amount of the catalyst suffices, and usually the amount of not less than 1000 ppm, preferably not less than 2000 ppm, is enough for suitable execution of the present invention. A further preferred amount of the catalyst is not less than 10000 ppm, more preferably not less than 100000 ppm.

Since the catalysts become a starting point of the CVD reaction for generating CNT, it is desirable to make the catalysts fine and allow the catalysts to be carried on the pre-baked starting material in a state of being dispersed as uniformly as possible.

A method for allowing the catalysts to be carried on the pre-baked starting material is not limited and for example, can be carried out by mixing the pre-baked starting material with the catalysts prepared in a fine form. Alternatively, this can be also carried out by previously allowing a carrier composed of metal oxide (for example, zeolite, alumina, magnesia) to carry the catalysts and then mixing the carrier and the pre-baked starting material.

The catalysts can also be allowed to be carried on the pre-baked starting material by mixing a transition metal hydroxide as the catalysts with the pre-baked starting material. The transition metal hydroxide can be obtained by dissolving a transition metal alkoxide or a transition metal complex in alcohol to synthesize an alcohol solution of metal complex, subjecting the solution to hydrolysis and then filtering off the obtained precipitated product. When synthesizing a transition metal hydroxide through hydrolysis by using a transition metal alkoxide or a transition metal complex as a starting material, further fine particles can be obtained and it can function as a reaction starting point.

A preferable method of allowing a pre-baked starting material to carry a catalyst includes contacting the pre-baked starting material with an ion (including complex ion) or a complex of the above catalyst (for example metal, in particular transition metal) in a solution-state and then allowing the catalyst to be adsorbed and carried on the pre-baked starting material. In this case, a nano size catalyst can be carried in nano size on the surface of the pre-baked starting material and the carried catalyst functions as a fine reaction starting point. For example, this method charges the pre-baked starting material in an ionic solution or complex solution of the catalyst and disperses the pre-baked starting material nearly uniformly. At this time, the pre-baked starting material may be charged directly or, preferably, can be charged after previously being dissolved into a solvent such as an alcohol (for example, ethanol, 2-methoxyethanol, isopropyl alcohol) or a mixture of water and alcohol (preferably alcohol). In the obtained mixture, a catalyst is adsorbed in the pre-baked starting material as a single ion or complex and then the pre-baked starting material is filtered off and subjected to drying and heat-treatment. Drying is a procedure for evaporating the solvent and can be carried out using a usual method, depending on the kind of the solvent. Heat treatment is a procedure for exchanging the catalyst adsorbed in the form of salt or complex to an oxide or the like and can be carried out using a usual method, depending on the kind of the salt or complex. The pre-baked starting material carrying the catalyst which is obtained in the above procedures can be preferably subjected to HIP treatment.

The ionic solution or complex solution of the catalyst can be prepared by dissolving a catalyst such as an acetate, nitrate, sulfate, chloride, alkoxide, organic metal compound (for example, organic zinc compound such as chloro(ethoxycarbonylmethyl)zinc, organic copper compound such as dimethyl copper lithium, organic magnesium compound such as Grignard reagent of methylmagnesium iodide and diethylmagnesium, organic lithium compound such as n-butyllithium, metal carbonyl, carbene complex, metallocene such as ferrocene), a transition metal complex (for example, transition metal acetylacetonate) and the like in a solvent such as water, alcohol (for example, ethanol, 2-methoxyethanol, isopropyl alcohol), or a mixture of water and alcohol (preferably, alcohol). Among these, one prepared by using an acetate or an acetylacetonate of a catalyst (preferably, a transition metal) is preferred. In addition, preferable transition metals include cobalt, iron, nickel, molybdenum, tungsten and among these, iron, cobalt and nickel are preferable and particularly, cobalt is preferred. These transition metals can be used alone or in combination of two or more in mixture.

Carrying catalyst on a pre-baked starting material can be conducted also by allowing a powdery and/or particulate material of an organic compound before pre-baked to carry the catalyst and then subjecting to pre-baking. In this case, allowing the powdery and/or particulate material of the organic compound before pre-baked to carry the catalyst can be carried out in the same manner as in the above method of allowing the pre-baked starting material to carry the catalyst.

The pre-baked starting material carrying the catalyst is pre-baked at a specified temperature elevating rate in a nitrogen gas stream or in an inert atmosphere. For the pre-baking, an electric heating or gas heating type externally heating furnace, continuous multi-tubular furnace, internal heating rotary kiln, rocking furnace or the like is used.

In the present invention, the kind and amount of gases for causing a reaction for vapor phase growth during the HIP treatment can be controlled by the pre-baking temperature or the amount of remaining hydrogen in the pre-baked starting material. Namely, in a fixed amount of a certain organic compound, the kind, concentration and total amount of gases (hydrogen, hydrocarbon, carbon monoxide, steam and the like) to be generated during the HIP treatment naturally become constant as far as the pre-baking temperature is constant. Also, each amount of the generated hydrogen, hydrocarbon, carbon monoxide, steam and the like has a correlation with the amount of remaining hydrogen. Accordingly, the degree of pre-baking can be properly adjusted by using the pre-baking temperature or the amount of remaining hydrogen as an index.

The pre-baking temperature can vary depending on various conditions such as the kind of the organic compound to be used and the maximum ultimate temperature at the HIP treatment, and usually is preferably not less than 400° C., desirably within a range from about 500° C. to about 1000° C.

The preferred range of the amount of remaining hydrogen varies depending on the size of the organic compound to be used, and is usually within a range from about 500 ppm to about 60000 ppm, preferably from about 2500 ppm to about 40000 ppm.

In the case of selectively generating CNT, it is preferable that the pre-baking temperature is within a range from about 500° C. to about 700° C. and the amount of remaining hydrogen is within a range from about 20000 ppm to about 40000 ppm. In the case of using the organic material having a size of about 1 µm or less (for example, carbon black having a size of about 1 µm or less) as a material (powdery and/or particulate material) to be pre-baked, the range from about 500 ppm to about 20000 ppm is preferred.

The pre-baked starting material carrying the catalyst is filled in a closed vessel that is made of a heat-resistant material, and is subjected to HIP treatment using the vessel as a reaction vessel. The closed vessel functions as a reaction vessel for causing the CVD reaction with hydrogen, carbon monoxide and hydrocarbon gases generated from the pre-baked starting material during the HIP treatment. Since it is necessary to cause a chemical reaction without scattering the generated reaction gas outside the vessel while keeping isotropic high pressure by a gas pressure, the material of the vessel and the sealing structure thereof are properly selected. If the material is too dense, a difference in pressures between the inside and the outside of the vessel arises, which results in an explosive breakdown of the vessel. On the other hand, if the material is too porous, the reaction gas generated inside the vessel is easily scattered outside the vessel and efficiency of the chemical reaction is lowered to a large extent.

The material and structure of the vessel are properly selected in consideration of necessity of taking a HIP-treated product out of the vessel, sealing the vessel as easily as possible in view of facilitating charging of the starting material before the HIP treatment, and maintaining strength of the vessel at high temperature so as to be capable of withstanding the inside pressure caused by generation of the reaction gas from the pre-baked starting material, and also in consideration of exposure to high temperature during the HIP treatment.

Examples of the heat resistant materials constituting the closed vessel are graphite and in addition, ceramics such as alumina, magnesia and zirconia, and metals such as iron, nickel, zirconium and platinum. Among these, graphite is preferred.

Graphite vessels made of, for example, artificial graphite materials prepared by extrusion molding, CIP molding, squeeze molding, vibration molding or rammer molding, hard carbon materials, including glassy carbon, prepared mainly by thermosetting resin molding, carbon fiber-reinforced carbon materials or composite materials thereof are exemplified as the graphite vessel. The open pore ratio of the graphite material relates to efficiency of the chemical reaction in the vessel. In the case of a material having an open pore ratio of 20% or more, the reaction gases are excessively diffused outside the vessel, and therefore, a concentration of the gases necessary for generating the intended CNT cannot be kept. Example of a suitable graphite vessel is a graphite crucible.

A screw-capped graphite crucible can be preferably used so that charging of the pre-baked starting material in the vessel and discharging of the product after the HIP treatment can be carried out efficiently.

Figure 1:
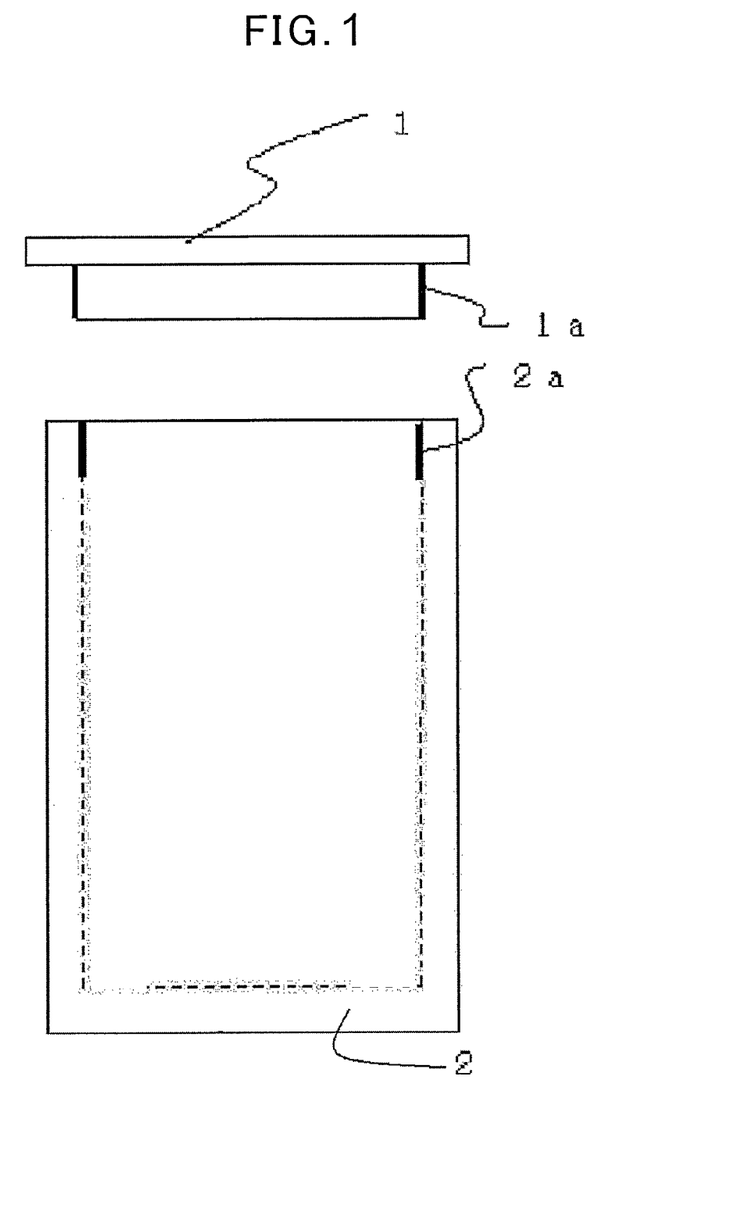
FIG. 1 A cross-sectional view of graphite crucible having a top screw cap.
Figure 2:
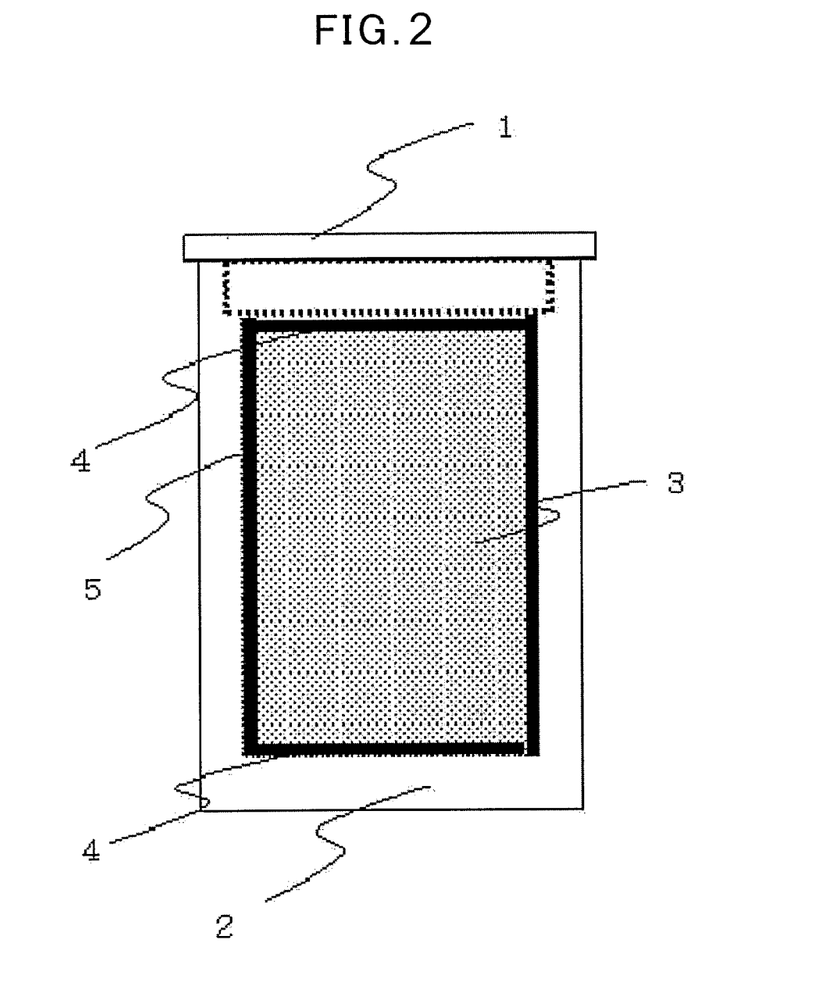
FIG. 2 A cross-sectional view of the top closed graphite crucible of FIG. 1, in which a pre-baked starting material is charged and all of the top and bottom thereof is covered with spacers and all of the side thereof is covered with a sleeve.

FIG. 1 is a cross-sectional view of the structure of the top screw-capped graphite crucible. The inner wall $2a$ at the top of the crucible body 2 and the outer circumference $1a$ of the crucible cap 1 are threaded by specified tap processing, and thereby the crucible can be sealed by turning the crucible cap 1 to the thread after charging of the pre-baked starting material 3. In addition, the pre-baked starting material 3 can be subjected to HIP treatment by covering the whole (or a part) of the top and/or bottom thereof with spacers made of a carbon material for the purposes of preventing scattering of gas for vapor phase growth reaction and increasing the gas concentration, thereby enhancing a reaction efficient. Further, the pre-baked starting material 3 can be subjected to HIP treatment by covering the whole (or a part) of the side thereof with a sleeve made of a carbon material for the same purposes as mentioned above. FIG. 2 shows the pre-baked starting material 3 being in a state where all of the top and bottom thereof being covered with the spacers 4 and all of the sides thereof are covered with the sleeve 5. Examples of the carbon material for the spacer and the sleeve are graphite, glassy carbon, diamond-like carbon, amorphous carbon and the like, and one of them can be used alone or two or more thereof can be used together. Among these, a spacer or sleeve made of graphite is preferred. In the present invention, the spacer is one covering the pre-baked starting material filled in the vessel mainly at the top or bottom thereof and the sleeve is one covering the pre-baked starting material filled in the vessel mainly at the side thereof. However, there is a case where discrimination of the both does not make sense, depending on the shape of the vessel.

With respect to the material of the graphite crucible, it is preferable to use artificial graphite or isotropic graphite material having a bulk density of 1.6 to 1.9, an open pore ratio of less than 20%, a pore size of not more than 3 μm and a thermal conductivity of not less than 50 W/(m·K).

In the present invention, by subjecting the pre-baked starting material to HIP treatment, gases such as hydrogen, hydrocarbon and carbon monoxide are generated and the CVD reaction proceeds inside the reaction vessel. These gases can be generated at the temperature range from about 400° C. to about 1500° C. depending on kind of the starting material by controlling the pre-baking temperature and the HIP treating conditions.

The temperature elevating rate in HIP treatment is, for example, about 20° C. or more per hour, preferably about 100° C. or more per hour and more preferably about 300° C. or more.

The maximum ultimate temperature range at the HIP treatment for generating CNT can vary depending on various conditions such as kind and amount of the catalyst and the maximum ultimate pressure at the HIP treatment, and is, for example, from about 850° C. to about 1300° C. The maximum ultimate pressure at the HIP treatment is, for example, within a range from 1 MPa to about 300 MPa, preferably within a range from about 1 MPa to 200 MPa and more preferably within a range from about 10 MPa to 200 MPa.

In HIP treatment, it is preferable to increase the inside pressure to a given value until the temperature rise to a pre-baking temperature of the starting material and apply enough pressure in a temperature range higher than the pre-baking temperature. The given pressure value is a pressure that is enough to prevent scattering to the outside of the vessel of various gases which are generated in the temperature range higher than the pre-baking temperature and used as a starting material of vapor phase growth. An example of the given pressure is about 0.5 MPa.

In the case of selectively generating a band shape CNT, the maximum ultimate temperature at the HIP treatment is an important factor. Examples of the maximum ultimate temperature range are about 750° C. to about 1200° C., more preferably about 800° C. to about 1150° C. and further preferably about 850° C. to about 1150° C. In this case, the maximum ultimate pressure at the HIP treatment is, for example, within a range from 10 MPa to 300 MPa, preferably within a range from 20 MPa to 200 MPa and more preferably within a range from about 40 MPa to about 200 MPa.

The thus obtained band shape CNT of the present invention can be returned to the original CNT by heat treating (for example, at the temperature of not less than 100° C.), if necessary, the band shape CNT to remove the pressure medium gas adsorbed on the surface thereof, dissolving the band shape CNT to the organic solvent, applying, if necessary, ultra sonic wave or a high-speed shearing force by a homogenizer, further subjecting, if necessary, the band shape CNT to centrifugation to divide supernatant, followed by distillation of the solvent using a usual method.

Moreover, dispersion liquid in which CNT is dispersed (CNT dispersion liquid) can be obtained by dispersing the band shape CNT of the present invention which is, if necessary, heat-treated to an organic solvent and optionally adding additives (for example, a viscosity improver, a dispersant, a diluent, and the like) which are usually used in this field, or by applying, if necessary, ultra sonic wave or a high-speed shearing force by a homogenizer to the mixture containing the thus obtained CNT, and further subjecting, if necessary, the mixture to centrifugation to divide supernatant.

Examples of the organic solvent are 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, ethylene carbonate, phenyl phosphoric acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol, methyl ethyl ketone, 2-methoxyethanol, dimethylacetamide, toluene, polybenzimidazole, water to which a surfactant is added and the like. Among these, dimethylformamide, water to which a surfactant is added, 2-methoxyethanol and the like are preferable.

Examples of such surfactants that can be used are: anion type surfactants (anionic surfactants) such as fatty acid salts (for example, sodium dodecanoate), cholic acid salts (for example, sodium cholate), monoalkyl sulfates (for example, sodium lauryl sulfate), alkyl polyoxyethylene sulfate, alkyl benzene sulfonates (for example, sodium dodecyl benzene sulfonate) and monoalkyl phosphate;

cation type surfactants (cationic surfactants) such as alkyl trimethyl ammonium salts (for example, cetyl trimethyl ammonium bromide), dialkyl dimethyl ammonium salts (for example, didecyl dimethyl ammonium chloride) and alkyl benzyl dimethyl ammonium salts (for example, alkyl benzyl dimethyl ammonium chloride);
amphoteric surfactants (Gemini surfactants) such as alkyl dimethyl amine oxide and alkyl carboxybetaine; and
non-ion type surfactants (nonionic surfactants) such as polyoxyethylene alkyl ether (for example, polyoxyethylene dodecyl ether), fatty acid sorbitan ester, alkyl polyglucoside, fatty acid diethanol amide and alkyl monoglyceryl ether. Among these, monoalkyl sulfates and fatty acid salts can be suitably used.

A means for ultrasonic wave treatment is not particularly limited, and it can be carried out by using, for example, an ultrasonic cleaner. It is preferable that a frequency of an ultrasonic wave to be applied is within a range from about 20 kHz to about 100 kHz. A period of time for the treatment is preferably from about 1 minute to about 60 minutes.

In the case of using a homogenizer, the condition thereof is set at a rotating rate within a range from 1000 to 50000 rpm and preferably from 5000 to 30000 rpm.

It is preferable that centrifugation is carried out at an acceleration rate within a range from about 100 G to about 100000 G, preferably from about 100 G to about 10000 G, for about 1 minute to about 60 minutes, preferably for about 5 minutes to about 30 minutes.

The thus obtained CNT dispersion can be used, for example, as an ink to be used for forming a circuit and a thin film for printable electronic products. In other words, a circuit and the like can be formed by printing the CNT dispersion on a surface of a substrate by various printing methods such as flexographic printing (letterpress printing), offset printing (planographic printing), gravure printing (intaglio printing), screen printing, ink jet printing, electrophotography, heat transfer and laser transfer.

Moreover, a desired circuit can be obtained by applying the CNT dispersion on a substrate by wet coating such as spin coating, slit coating, bar coating, blade coating or spray coating and then carrying out patterning on the coated substrate by using a patterning technique such as nano-micro contact printing, dip-pen lithography, nano-micro transfer, nanoimprinting, electron beam lithography, or photolithography.

Furthermore, a desired circuit can be obtained by applying the CNT obtained above on a substrate by dry coating such as vacuum deposition, sputtering or CVD to form a film on the substrate and then carrying out patterning on the substrate by using the above-mentioned patterning technique.

Moreover, various high functional films such as a transparent conductive film, a highly conductive film and a high thermal conduction film containing the CNT can be obtained by dispersing or mixing the CNT or CNT dispersion obtained above in or with a starting resin of a PET film, an ionomer film (IO film), a polyethylene film made of high density polyethylene (HDPE), medium-density polyethylene (MDPE), low-density polyethylene (LDPE), linear low-density polyethylene (L-LDPE) or metallocene catalyst type linear low-density polyethylene (mL-LDPE), hard, semi-hard or soft polyvinyl chloride film (PVC film), polyvinylidene chloride film (PVDC film), polyvinyl alcohol film (PVA film), polypropylene film (PP film), polyester film, polycarbonate film (PC film), polystyrene film (PS film), polyacrylonitrile film (PAN film), ethylene-vinyl alcohol copolymer film (EVOH film), ethylene-methacrylic acid copolymer film (EMAA film), nylon film (NY film, polyamide (PA) film), or cellophane.

In the production of the above circuits and films, melt extrusion molding method, inflation method, T die method, flat die method, solvent casting method, calendaring method, stretching method, multilayer processing method, co-extrusion method, co-extrusion by inflation method, multi-manifold method, laminating method, extrusion-laminating method, laminating method using an adhesive, wet laminating method, dry laminating method, hot-melt laminating method, heat-seal method, external heating method, internal heating method, corona treatment, plasma treatment can suitably use existing techniques such as flame treatment, matt processing, coating, wet coating, dry coating, deposition, ion plating, ion plating, and sputtering.

Moreover, resin composite materials such as molded resin articles and fiber-reinforced plastics (FRP) containing the CNT and having improved electric conductivity, thermal conductivity, heat resistance, strength, fracture toughness and flexibility can be obtained by dispersing or mixing the obtained CNT or CNT dispersion in or with natural resins derived from plants such as rosin, dammar, dammar, mastic, copal, amber, balsam and natural rubber, natural resins derived from animals such as shellac, glue, tortoiseshell and casein, thermosetting resins such as phenol resin, epoxy resin, melamine resin, urea formaldehyde resin, unsaturated polyester resin, alkyd resin, polyurethane and thermosetting polyimide, thermoplastic resins such as polyethylene, high density polyethylene, medium-density polyethylene, low-density polyethylene, polypropylene, polyvinyl chloride, polyvinylidene chloride, polystyrene, polyvinyl acetate, polytetrafluoroethylene, ABS resin, AS resin and acrylic resin, and plastic materials such as engineering plastics such as polyamide, nylon, polyacetal, polycarbonate, modified polyphenylene ether, polybutylene terephthalate, polyethylene terephthalate, glass fiber-reinforced polyethylene terephthalate, cyclic polyolefin, polyphenylene sulfide, polysulfone, polyether sulfone, amorphous polyarylate, crystalline polymer, polyether ether ketone, thermoplastic polyimide and polyamide-imide, and, then, kneading, drying and molding.

Also, rubbers and rubber composite materials containing CNT and having improved electric conductivity, thermal conductivity, heat resistance, strength and flexibility can be obtained by dispersing or mixing the obtained CNT or CNT dispersion in or with synthetic rubbers such as acrylic rubber, nitrile rubber, isoprene rubber, urethane rubber, ethylene propylene rubber, epichlorohydrine rubber, chloroprene rubber, silicone rubber, styrene-butadiene rubber, butadiene rubber, fluorine-containing rubber and polyisobutylene rubber, and, then, kneading, drying and molding.

Moreover, various composite materials containing CNT and having improved electric conductivity, thermal conductivity, heat resistance, strength, fracture toughness and electromagnetic wave shielding property can be obtained by dispersing or mixing the obtained CNT or CNT dispersion in or with oxides such as pottery, glass, cement, mortar, gypsum, enamel, alumina and zirconia, hydroxides such as hydroxyapatite, carbides such as silicon carbide and boron carbide, carbonates, nitrides such as silicon nitride, boron nitride, aluminum nitride and GaN, halides such as fluorite, phosphate, barium titanate, and ceramic materials such as high temperature superconductive ceramics, ferrite, lead zirconium titanate, steatite, zinc oxide and GaAs, and, then, kneading, drying, molding, baking and sintering.

Moreover, various materials containing CNT and having improved electric conductivity, thermal conductivity, heat resistance, magnetic properties, strength, elasticity and fracture toughness can be obtained by dispersing or mixing the obtained CNT or CNT dispersion in or with elements such as tungsten, rhenium, osmium, tantalum, molybdenum, niobium, iridium, ruthenium, hafnium, technetium, boron, rhodium, vanadium, chromium, zirconium, platinum, thorium, lutecium, titanium, palladium, protactinium, thulium, scandium, iron, steel, cast iron, yttrium, erbium, cobalt, holmium, nickel, dysprosium, silicon, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, tellurium, zinc, lead, cadmium, thalium, bismuth, polonium, tin, tin, lithium, indium, sulfur, sodium, potassium, rubidium, gallium, cesium, and alloys, carbides, oxides, nitrides and hydroxides of these elements, and, then, kneading, drying, molding, extruding, pressing, melting, casting, forging, rolling, granulating and flame spraying.

Among materials, CNT has most excellent electron mobility and strength, and therefore, from this point of view, high functionalization can be achieved in the above-mentioned various materials using CNT. Further, it is possible to obtain composite materials by further mixing it with fibers such as carbon fiber, carbon fiber, graphene, carbon nanofiber and poly-paraphenylene terephthalamide according to necessity.

Furthermore, intercalation compounds can be formed by incorporating various guest species to a multilayer CNT (especially CNT having a small number of layers) like the case of graphite, and in the case of a single layer CNT, various guest species can be coordinated on its surface (coordination compound). By selecting suitable materials as guest species, characteristics of semiconductors (including n-type and p-type semiconductors) such as a band gap and carrier mobility can be adjusted.

With respect to such guest species, examples of a donor type material which can be suitably used are alkali metals such as Li, K, Rb, Cs and Na; alkali earth metals such Ca, Sr and Ba; metal elements such as Sm, Eu, Yb and Tm; alloys such as K—Hg, Rb—Hg, K-TI and Ba—Na; hydrogen or heavy hydrogen compounds such as KH, NaH and KD; and compounds in which ammonia or various organic molecules are coordinated on alkali metals and alkali earth metals, for example, Li-THF, K-THF, Rb-THF, Cs-THF, Na-THF, K—$NH_3$, Be—$NH_3$, Eu—$NH_3$, Ba-THF and Sr-THF. Examples of an acceptor type material which can be suitably used are halogens such as $Br_2$, $F_2$, ICl and $IF_3$, chlorides such as $MgCl_2$, $FeCl_3$, $FeCl_2$ and $NiCl_2$, halogen compounds such as $AlBr_3$, $CdBr_2$, $HgBr_2$, $FeBr_3$, $AsF_5$, $SbF_5$ and $NbF_5$, oxides such as $CrO_3$, $MoO_3$, $HNO_3$, $H_2SO_4$ and $HClO_4$, and the like. In addition, hydrogen fluoride, graphite fluoride, graphite oxide, and the like can be used suitably as an acceptor type material.

Examples of graphite intercalation compounds are a 1st stage compound, in which guest species are inserted between all the layers, a 2nd stage compound, in which guest species are inserted on every other layer, and a higher stage compound in the same manner, and physical properties of the obtained material can be controlled by adjusting the number of stages. The same thing can be applied in the case of CNT, too. Examples of a method for adjusting the number of stages are methods of adjusting a temperature, a pressure, a concentration when bringing a solvent containing guest species or vaporized or liquefied guest species into contact with a host material.

For synthesizing the intercalation compound and coordination compound of these CNTs, it is possible to suitably use various synthesizing methods such as a two-zone method or a two valve method, in which CNT being a host material (one to be intercalated) and guest species (intercalating one) are charged into separate portions in a reaction tube usually in vacuo or under reduced pressure or under inert gas atmosphere and, then, a temperature difference or a pressure difference is applied to both of the host material and guest species to undergo a vapor phase reaction; a method of subjecting a reaction tube containing a simple mixture of the respective materials to high temperature treatment; a solution method or an immersion method, in which a host material is immersed in various solutions; and a ternary solution method, in which complexes or ions of alkali metal and alkali earth metal are formed in an organic solvent and are brought into contact with a host material.

Moreover, it is effective to make conventional carbon materials high functional ones by mixing the obtained CNT or CNT dispersion with various carbon materials such as artificial graphite, natural graphite, kish graphite, HOPG, activated carbon, carbon black, glassy carbon, diamond-like carbon and mesophase spherical graphite.

Further, it is possible for the obtained CNT or CNT dispersion to be applied to electrode materials for various batteries such as lithium ion battery, lithium ion capacitor, fuel cell electrode substrate, dye-sensitized solar cell, thin film solar cell, metal-air battery, lithium sulfur battery and nickel-metal hydride battery, occlusion material for hydrogen, etc., catalytic effect in a chemical reaction using a graphene surface, a novel reaction site in medical and pharmaceutical fields, and a drug delivery system.

In the present invention, an amount of hydrogen is one measured in accordance with General Rules for Determination of Hydrogen in Metallic Materials (JIS Z 2614: 1990. Determination is carried out by an inert gas heating method which is a condition for "steel". The measurement is concretely conducted by heating a sample up to 2000° C. under argon gas atmosphere and measuring an integrated amount of generated hydrogen by gas chromatograph.). The amount of hydrogen is represented by % by weight or parts per million (ppm) by a weight.

The open pore ratio (apparent porosity) is a volumetric ratio of cavities (open) which are present in the volume of a material calculated from its outer dimensions and into which cavities liquid and gas can invade. Generally materials having a high open pore ratio have continuous pores and gas permeability. Herein, an open pore ratio is obtained from the following equation.

Open pore ratio (%)=((Apparent specific gravity−Bulk specific gravity)/Apparent specific gravity)×100

The present invention is then explained by means of Examples, but is not limited to the following Examples.

EXAMPLE

The present invention is then explained by means of Examples, but is not limited thereto.

Example 1

Spherical phenol resin having an average particle size of 15 μm was pre-baked at a maximum ultimate temperature of 600° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 24000 ppm.

A solution containing 5 parts by weight of cobalt acetate (available from Wako Pure Chemical Industries, Ltd., special grade) and 95 parts by weight of 2-methoxyethanol (available from Wako Pure Chemical Industries, Ltd., purity 99%) was prepared. Excess amount, 100 g, of 2-methoxuethanol solution of cobalt acetate was added to 50 g of a pre-baked starting material, followed by stirring for an hour with a magnetic stirrer. A slurry after stirring was filtered with a glass filter (filter diameter: 2 G) to obtain a solid material. The obtained solid material was dried in the air at 120° C. for two hours and then subjected to heat treatment in the air at 400° C. for 20 minutes to obtain a mixture in which cobalt oxide was carried on the pre-baked starting material.

The mixture was charged in a screw type graphite crucible (open pore ratio: 7%, bulk density: 1.80, pore size: 3 μm, thermal conductivity: 120 W/(m·K)), and a screw type top cover was turned to tighten the screw and seal the crucible. The sealed graphite crucible containing the starting material was charged in HIP equipment, and then the inside temperature was increased to 900° C. (maximum ultimate temperature) at a temperature elevating rate of 500° C. per hour while carrying out isostatic pressing at 190 MPa (maximum ultimate pressure) using argon gas. Then, the maximum ultimate temperature and pressure were maintained for an hour, and the temperature and pressure was reduced.

Figure 3:
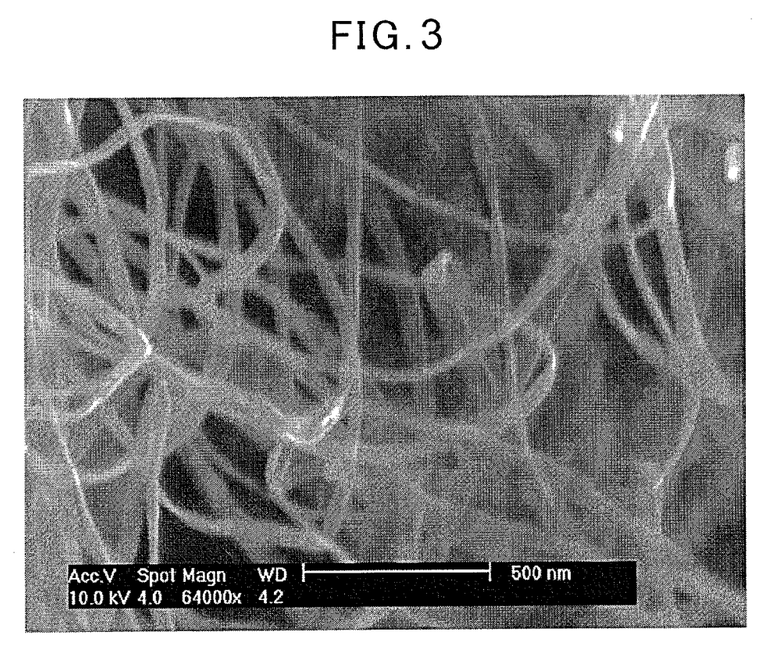
FIG. 3 A scanning electron microscope (SEM) photograph of the band shape CNT obtained in Example 1.

The treated sample was observed using SEM (FIG. 3). As shown in FIG. 3, the treated sample has a special shape in which CNT with a circular cross-section is wholly compressed to form a band. However, the CNT was not uniformly or completely pressed in the whole length thereof and a part which was not pressed much or a part which was not uniformly pressed still existed. The width of the band shape CNT measured from the SEM photograph was about 30 to about 60 nm and the wall thickness consisting a tube of the band shape CNT (wall thickness of a band shape CNT) was about 5 to about 10 nm. The band shape CNT forming a bundle with each other was not observed.

Example 2

HIP treatment was carried out in the same manner as in Example 1 except that a maximum ultimate pressure was 90 MPa, a maximum ultimate temperature was 1000° C. and this pressure and temperature were maintained for two hours.

Figure 4:
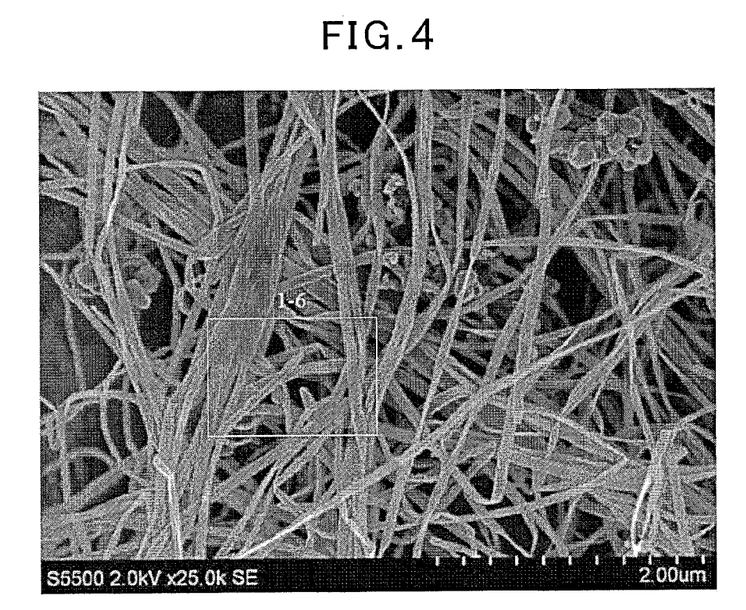
FIG. 4 A SEM photograph of the band shape CNT obtained in Example 2.
Figure 5:
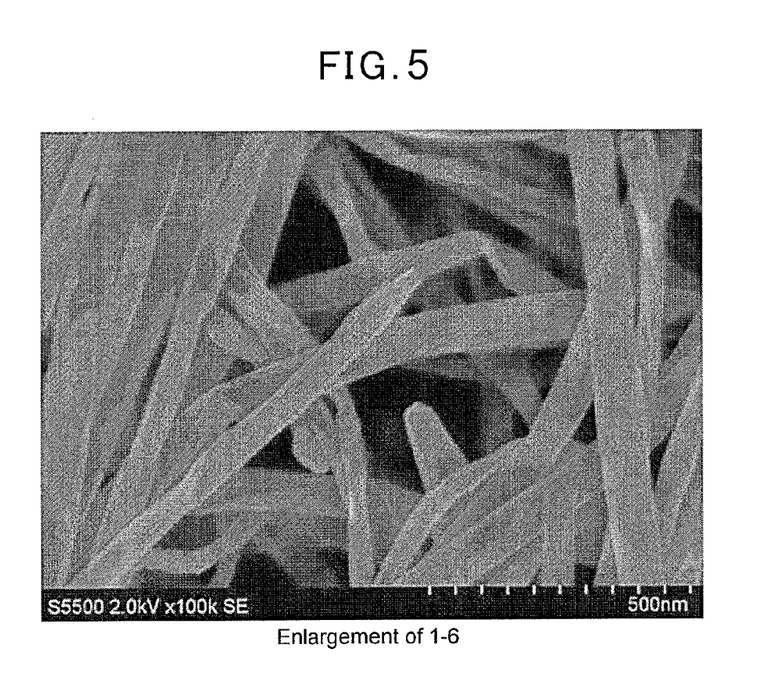
FIG. 5 An enlarged view of the part shown as 1-6 in FIG. 4.

The treated sample was observed using SEM (FIGS. 4 and 5). As shown in FIGS. 4 and 5, the treated sample has a special shape in which CNT with a circular cross-section is wholly compressed to form a band. However, the CNT was not uniformly or completely pressed in the whole length thereof and a part which was not pressed much or a part which was not uniformly pressed still exists. The width of the band shape CNT measured from the SEM photograph was about 100 nm and the wall thickness was about 10 to about 20 nm. The part in which a plurality of band shape CNTs are adhered to each other and form a bundle partially exist.

Example 3

Spherical phenol resin having an average particle size of 1 μm was pre-baked at a maximum ultimate temperature of 600° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 23000 ppm.

A solution containing 1 part by weight of cobalt acetate (available from Wako Pure Chemical Industries, Ltd., special grade) and 99 parts by weight of ethanol (available from Wako Pure Chemical Industries, Ltd., purity 99%) was prepared. Excess 100 g of ethanol solution of cobalt acetate was added to 50 g of a pre-baked starting material, followed by stirring for an hour with a magnetic stirrer. A slurry after stirring was filtered with a glass filter (filter diameter: 2 G) to obtain a solid material. The obtained solid material was dried in the air at 120° C. for two hours and then subjected to heat treatment in the air at 400° C. for 20 minutes to obtain a mixture in which cobalt oxide was carried on the pre-baked starting material.

The mixture was subjected to HIP treatment in the same manner as in Example 1 except that a maximum ultimate pressure was 90 MPa and a maximum ultimate temperature was 1000° C.

Figure 6:
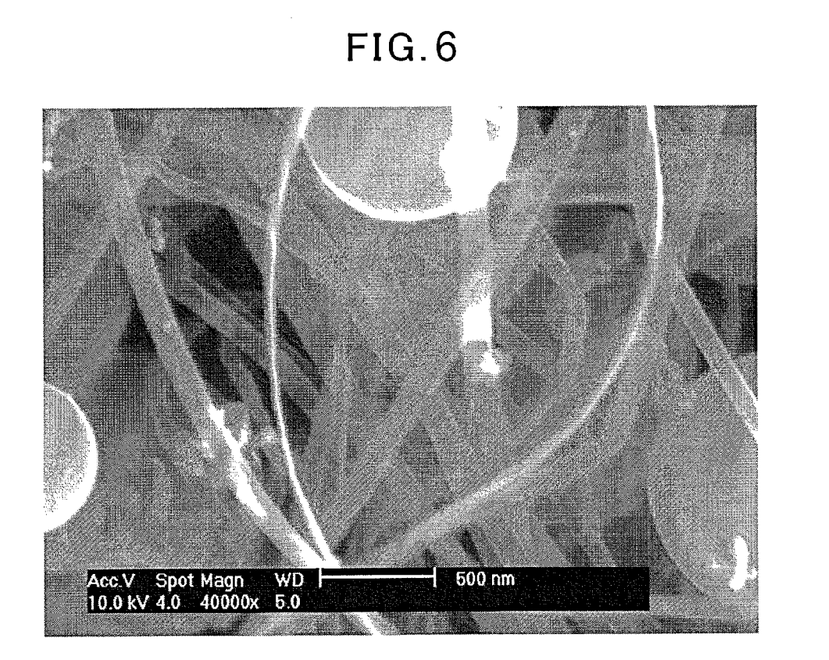
FIG. 6 A SEM photograph of the band shape CNT obtained in Example 3.

The treated sample was observed using SEM (FIG. 6). As shown in FIG. 6, the treated sample has a special shape in which CNT with a circular cross-section is wholly compressed to form a band. However, the CNT was not uniformly or completely pressed in the whole length thereof and a part which was not pressed much or a part which was not uniformly pressed still exists. The width of the band shape CNT measured from the SEM photograph was about 90 nm and the wall thickness was about 10 nm. The band shape CNT forming a bundle with each other was not observed.

Example 4

The treatment was carried out in the same manner as in Example 1 except that spherical phenol resin having an average particle size of 1 μm was used, a maximum ultimate temperature in pre-baking was 500° C. (amount of hydrogen remaining in the starting material was 39000 ppm) and a maximum ultimate pressure in HIP treatment was 90 MPa.

Figure 7:
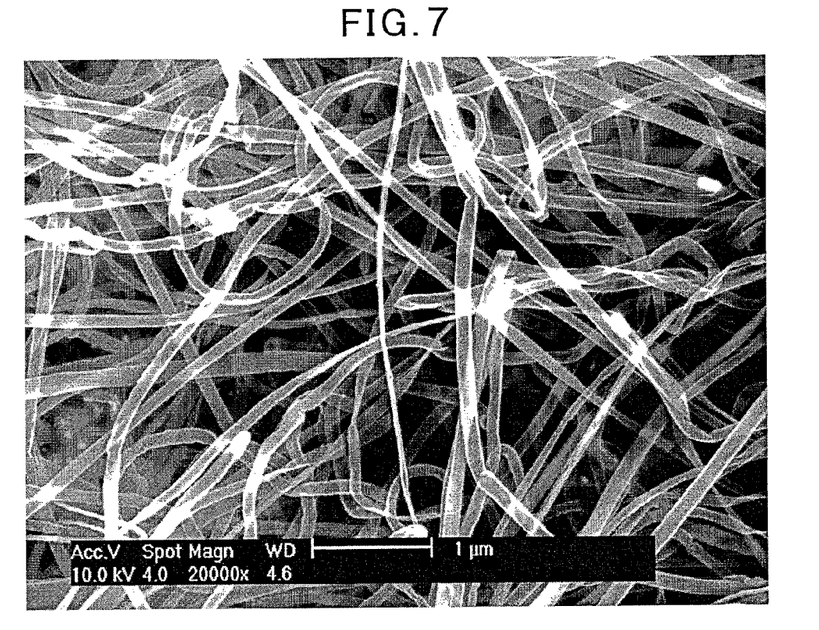
FIG. 7 A SEM photograph of the band shape CNT obtained in Example 4.
Figure 8:
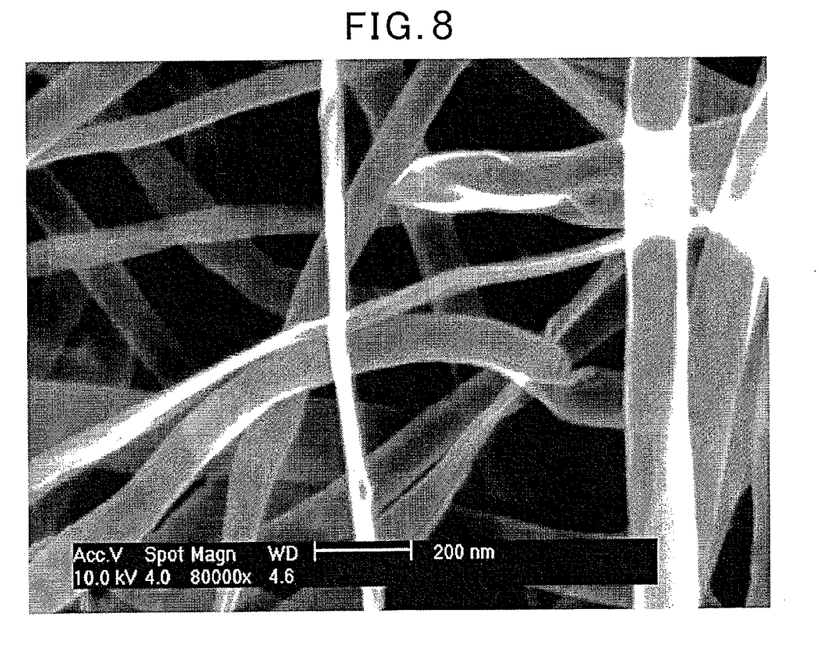
FIG. 8 An enlarged view of FIG. 7.

The treated sample was observed using SEM (FIGS. 7 and 8). As shown in FIGS. 7 and 8, the treated sample has a special shape in which CNT with a circular cross-section is wholly compressed to form a band. However, the CNT was not uniformly or completely pressed in the whole length thereof and a part which was not pressed much or a part which was not uniformly pressed still exists. The width of the band shape CNT measured from the SEM photograph was about 50 to about 100 nm and the wall thickness was about 2 to about 10 nm.

Figure 9:
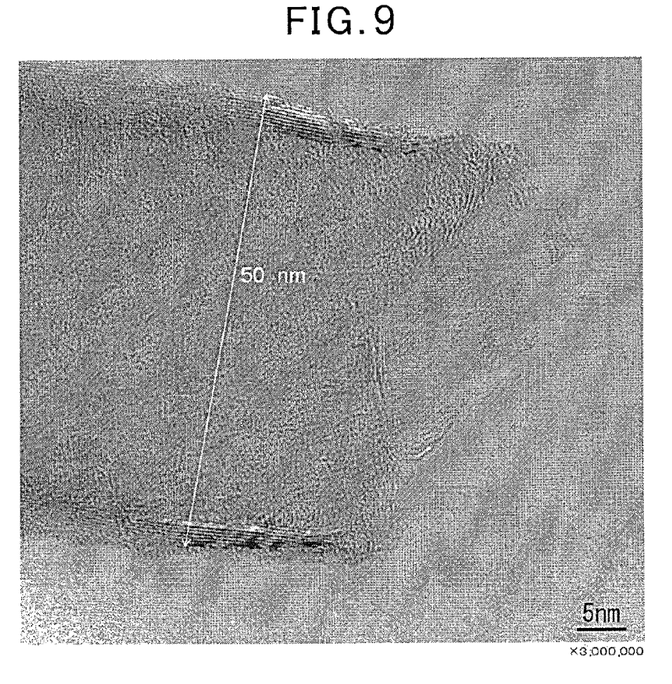
FIG. 9 A transmission electron microscope (TEM) photograph of the band shape CNT obtained in Example 4.
Figure 10:
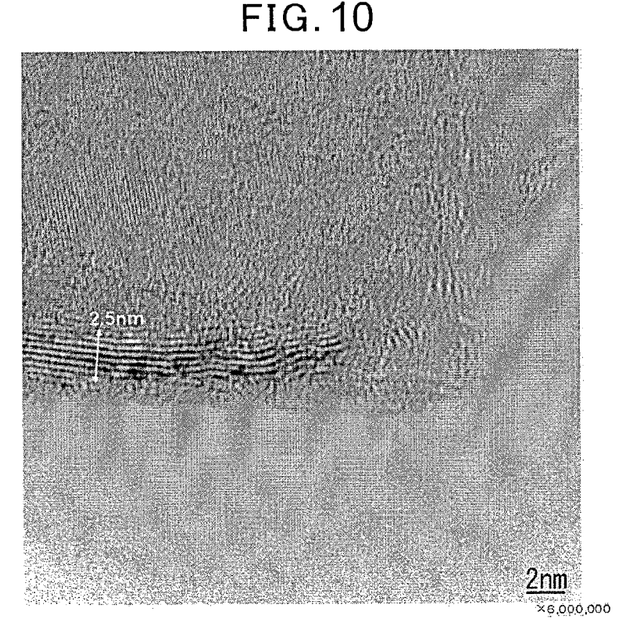
FIG. 10 An enlarged view of FIG. 9.

The treated sample was observed using TEM (FIGS. 9 and 10). The width of the band shape CNT measured from FIGS. 9 and 10 was about 50 nm and the thickness of the tube was about 2.5 nm. The band shape CNT forming a bundle with each other was not observed.

INDUSTRIAL APPLICABILITY

The carbon nanotube of the present invention is expected for industrial use or further application in various industrial fields such as hydrogen storing material for fuel cell-powered vehicle, catalyst-carrying substrate, thin film solar cell such as dye-sensitized solar cell, electrodes such as for field emission display (FED) assuring low power consumption, high luminance and low dependency on view angle and having self-luminescence in the fields of information home appliances, probe of tunneling microscope, an additive used for a conductive sheet and high thermal conductivity sheet as a measure for dust-proofing in semi-conductor manufacturing process by making use of high thermal conductivity and high electric conductivity thereof, an additive used for improving strength, electric conductivity, heat conductivity, softness of plastic, rubber, ceramics, metals and the like, a light-weight high strength composite material for robot, catalytic effect in a chemical reaction utilizing carbon hexagonal planes onedimensionally (CNT), two-dimensionally (surface of CNT) or three-dimensionally (inside space of CNT) (providing a novel reaction site in medical and pharmaceutical fields), a drug delivery system (DDS) and additionally, printable electronics, and the like.

EXPLANATION OF SYMBOLS 1 crucible cap
1a outer circumference of the crucible cap
2 crucible body
2a inner wall at the top of the crucible body
3 pre-baked starting material
4 spacer
5 sleeve

The invention claimed is:

1. A production method of a carbon nanotube which is compressed to form a band in its whole length or a part thereof, comprising
preparing a powdery and/or particulate material of an organic compound pre-baked to an extent of containing remaining hydrogen and allowed to carry a catalyst, which may be a transition metal, other metal or other element, thereon,
charging the powdery and/or particulate material of the organic compound in a closed vessel made of a heat resistant material, and
subjecting the powdery and/or particulate material of the organic compound together with the vessel to hot isostatic pressing treatment using a compressed gas atmosphere,
wherein a maximum ultimate temperature at the hot isostatic pressing treatment is 750 to 1200° C.

2. The production method of claim 1, wherein the width of the band shape part of the carbon nanotube is 15 nm to 300 nm and the thickness thereof is 1 nm to 20 nm.

3. The production method of claim 1, wherein the catalyst is one or two or more selected from the group consisting of (1) a transition metal selected from tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, manganese, americium, promethium, uranium, copper, samarium, gold, actinium, neodymium, berkelium, silver, praseodymium, lanthanum, californium, europium, ytterbium, cerium, plutonium, neptunium, (2) other metals selected from beryllium, germanium, calcium, strontium, barium, radium, aluminum, magnesium, zinc, lead, cadmium, thallium, bismuth, tin, lithium, indium, sodium, potassium, rubidium, gallium and cesium, (3) other elements selected from antimony, polonium, silicon and tellurium, (4) sulfide, boride, oxide, chloride, hydroxide, nitride and organometallic compound of any one of the above (1) to (3), and (5) a mixture of any of the above (1) to (3) and (4) and sulfur and/or sulfide (including an organosulfur compound) and a mixture of any of the above (1) to (3) and (4) and boron and/or boride (including an organoboron compound).

4. The production method of claim 1, wherein the powdery and/or particulate material carrying catalysts adsorbs a transition metal thereon through a process of contacting the powdery and/or particulate material of the organic compound before or after pre-baked with an ion or complex of the transition metal in a solution-state.

5. The production method of claim 4, wherein a solvent in the solution-state is selected from water, an alcohol or a mixture of water and alcohol, and the ion or complex of the transition metal in the solution-state is obtained by dissolving an acetate, nitrate, sulfate, chloride, alkoxide, organic metal compound of the transition metal or a transition metal acetylacetonate in the solvent.

6. The production method of claim 1, wherein the organic compound is one or two or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea formaldehyde resin, melamine resin, benzoguanamine resin, epoxy resin, diallyl phthalate resin, unsaturated polyester resin, a bisphenol A type epoxy resin, Novolac type epoxy resin, polyfunctional epoxy rein, alicyclic epoxy resin, alkyd resin, urethane resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene, anthracene, petroleum pitch, coal pitch, petroleum coke, coal coke, carbon black, activated carbon, waste plastic, waste wood, waste plant and garbage.

7. The production method of claim 1, wherein the powdery and/or particulate material of the organic compound which is pre-baked to an extent of containing remaining hydrogen is one or two or more powdery and/or particulate materials selected from the group consisting of petroleum coke, coal coke and carbon black having hydrogen corresponding to the remaining hydrogen beforehand.

8. The production method of claim 1, wherein the closed vessel made of a heat resistant material is a screw-capped graphite crucible.

9. The production method of claim 2, wherein the catalyst is one or two or more selected from the group consisting of (1) a transition metal selected from tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, manganese, americium, promethium, uranium, copper, samarium, gold, actinium, neodymium, berkelium, silver, praseodymium, lanthanum, californium, europium, ytterbium, cerium, plutonium, neptunium, (2) other metals selected from beryllium, germanium, calcium, strontium, barium, radium, aluminum, magnesium, zinc, lead, cadmium, thallium, bismuth, tin, lithium, indium, sodium, potassium, rubidium, gallium and cesium, (3) other elements selected from antimony, polonium, silicon and tellurium, (4) sulfide, boride, oxide, chloride, hydroxide, nitride and organometallic compound of any one of the above (1) to (3), and (5) a mixture of any of the above (1) to (3) and (4) and sulfur and/or sulfide (including an organosulfur compound) and a mixture of any of the above (1) to (3) and (4) and boron and/or boride (including an organoboron compound).

* * * * *